US009335569B1

United States Patent
Levine

(10) Patent No.: US 9,335,569 B1
(45) Date of Patent: May 10, 2016

(54) TUNABLE-FOCUS THIN ELECTRONIC LENS

(71) Applicant: NORTHROP GRUMMAN SYSTEMS CORPORATION, Falls Church, VA (US)

(72) Inventor: Darren V. Levine, Acton, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 14/665,193

(22) Filed: Mar. 23, 2015

(51) Int. Cl.
| | |
|---|---|
| *G02B 3/08* | (2006.01) |
| *G02B 3/00* | (2006.01) |
| *G02F 1/01* | (2006.01) |
| *G02F 1/1335* | (2006.01) |
| *G02F 1/17* | (2006.01) |
| *G02F 1/157* | (2006.01) |

(52) U.S. Cl.
CPC ............. *G02F 1/0121* (2013.01); *G02B 3/08* (2013.01); *G02F 1/133526* (2013.01); *G02F 1/157* (2013.01); *G02F 1/172* (2013.01)

(58) Field of Classification Search
CPC ....... G02F 1/172; G02F 1/0121; G02F 1/157; G02B 3/08
USPC .................. 359/642, 664, 712, 741, 742, 796
See application file for complete search history.

(56) References Cited

U.S. PATENT DOCUMENTS

| | | | |
|---|---|---|---|
| 4,210,391 A | 7/1980 | Cohen | |
| 6,046,847 A | 4/2000 | Takahashi | |
| 6,353,508 B1 | 3/2002 | Burke | |
| 6,859,333 B1 | 2/2005 | Ren et al. | |
| 7,502,178 B2 | 3/2009 | Shenderova et al. | |
| 7,561,340 B2 | 7/2009 | Tseng et al. | |
| 7,914,174 B2 * | 3/2011 | Ho ............................. | G02B 3/08 359/742 |
| 8,471,999 B2 | 6/2013 | Valyukh et al. | |
| 8,736,962 B2 | 5/2014 | Dobschal et al. | |
| 2012/0060920 A1 | 3/2012 | Fornari et al. | |
| 2012/0260986 A1 | 10/2012 | Chen et al. | |
| 2014/0132904 A1 | 5/2014 | Bos et al. | |

OTHER PUBLICATIONS

Jeng, Shie-Chang et al. "Electrically Switchable Liquid Crystal Fresnel Lens Using UV-Modified Alignment Film" Optics Express, vol. 18, No. 25, Dec. 6, 2010, pp. 26325-26331.

Valley, Pouria et al. "Tunable-Focus Flat Liquid-Crystal Diffractive Lens" Optics Letters, vol. 35, No. 3, Feb. 1, 2010, pp. 336-338.

(Continued)

*Primary Examiner* — Tuyen Tra
(74) *Attorney, Agent, or Firm* — John A. Miller; Miller IP Group, PLC

(57) ABSTRACT

An optical lens assembly including a circular Fresnel lens having a plurality of contiguous radial lens sections where each lens section provides the same range of focal lengths and where each lens section includes a plurality of lens segments along a radial direction. Each of the lens segments is curved in both a radial direction and a rotational direction so that one radial edge of the section includes a relatively small curvature and large radius and an opposite radial edge of the lens section includes a relatively large curvature and small radius so that each lens segment separately provides the range of focal lengths. A light filter is positioned adjacent to the Fresnel lens and includes a plurality of radial control lines that are controlled to make the control lines opaque or transparent so that light propagates through parts of the lens sections having the same focal length.

20 Claims, 2 Drawing Sheets

(56) References Cited

OTHER PUBLICATIONS

Ren, Hongwen, et al. "Liquid Crystal Lens with Large Focal Length Tunability and Low Operating Voltage" Optics Express, vol. 15, No. 18, Sep. 3, 2007, pp. 11328-11335.

Lin, Liang-Chen, et al. "Highly Efficient and Polarization-Independent Fresnel Lens Based on Dye-Doped Liquid Crystal" Optics Express, vol. 15, No. 6, Mar. 19, 2007, pp. 2900-2906.

Ye, Mao, et al. "Liquid-Crystal Lens with a Focal Length that is Variable in a Wide Range" Applied Optics, vol. 43, No. 35, Dec. 10, 2004, pp. 6407-6412.

Fan, Yun-Hsing, et al. "Switchable Fresnel Lens Using Polymer-Stabilized Liquid Crystals" Optics Express, vol. 11, No. 23, Nov. 17, 2003, pp. 3080-3086.

Ren, Hongwen, et al. "Tunable Fresnel Lens Using Nanoscale Polymer-Dispersed Liquid Crystals" Applied Physics Letters, vol. 83, No. 8, Aug. 25, 2003, pp. 1515-1517.

Ren, Hongwen, et al. "Tunable Electronic Lens Using a Gradient Polymer Network Liquid Crystal" Applied Physics Letters, vol. 82n No. 1, Jan. 6, 2003, pp. 22-24.

Fujita, T. et al. "Fabrication of Micro Lenses Using Electron-Beam Lithography" Optics Letters, vol. 6, No. 12, Dec. 1981, pp. 613-615.

\* cited by examiner

TUNABLE-FOCUS THIN ELECTRONIC LENS

BACKGROUND

1. Field

This invention relates generally to an electronically focusable lens and, more particularly, to an electronically focusable lens assembly including a Fresnel lens having a plurality of segments that are each curved in both the radial and rotational directions and a light filter positioned proximate to the Fresnel lens that has a display that is selectively controlled to make portions of the light filter transparent so that light only propagates through portions of each segment of the Fresnel lens that have the same focal length so as to instantaneously change the focal length of the lens assembly.

2. Discussion

The curvature of a traditional lens determines its focal length. Various optical systems, such as cameras, require a lens with an adjustable focal length. This generally requires a lens assembly that includes at least two lenses, where the lenses are movable relative to each other to change the focal length of the combination of the lenses. A typical lens assembly of this type is focused by mechanically moving the lens farther or closer in the direction normal to the lens plane. Further, the larger the desired aperture (diameter of the lens) of the optical system, the larger and heavier the lens assembly needs to be. As such, these types of optical systems generally are required to have moving parts, be relatively thick compared to the lens width, require time to move the lens in order to focus the lens assembly and have a relatively small aperture. Because of these disadvantages, these types of lenses are limited in their applications.

A Fresnel lens is one type of known lens that is generally more compact and lighter than a traditional lens. A typical Fresnel lens is divided into concentric annular segments, where each segment has a different angular orientation that defines stepwise discontinuities between the segments, and where the angular orientation of the lens segments increases and the thickness of the lens segments decreases towards the outer edge of the lens so that the light is diffracted properly for the lens focal length. This allows the overall thickness of the lens to be reduced compared to that of a traditional lens.

Electronically focusable lenses that do not require two lenses to be moved relative to each other are known in the art. In one particular design, the lens is made of a liquid crystal material, where different voltages applied to the lens cause the lens to change its curvature, which changes its focal length. When changing the focal length of this type of lens, the focal length of the lens must go through all of the focal lengths between the current focal length and the desired focal length, where it takes a certain amount of time for that to occur. In other liquid crystal lens designs, the lens is able to be electronically focused from one focal length to another focal length without going through all of the focal lengths in between. However, these types of lenses are often not scalable, require large voltages to operate and use exotic materials that are not readily available.

DETAILED DESCRIPTION OF THE EMBODIMENTS

The following discussion of the embodiments of the invention directed to an electronically focusable lens assembly is merely exemplary in nature, and is in no way intended to limit the invention or its applications or uses.

As will be discussed below, the present invention proposes an optical lens assembly that can be instantaneously electronically focused to any focal length within a predetermined focal length range. As will become apparent, the lens assembly includes no moving parts, does not need to be circular, and is flat enough to be used as a thin film on windows, eyeglasses, contact lenses, virtual reality goggles, cell phones, solar panels, optical communications, projection displays, etc. Multiple lens assemblies can be sandwich together to make very thin magnifiers. Further, the lens assembly can electrically redirect large areas of light in complex patterns and directions while maintaining a significantly two-dimensional device profile. The optical lens assembly could look like a thin sheet of clear plastic with low profile lead inputs on its edge for the application of a voltage. Further, the lens assembly has the potential for lower power requirements, is thinner, can have a large aperture and doesn't move.

The lens assembly of the invention includes a modified Fresnel lens that has a plurality of segments that are curved in both the radial and rotational directions rather than only the radial direction, and a light filter that is positioned against the modified Fresnel lens that only allows light to propagate through selected sections of the Fresnel lens when a control signal is applied to the light filter, which is usually a voltage signal. As used herein, the radial direction is the direction from a center to an outer perimeter of the particular device and the rotational direction is the direction around the particular device. The light filter selectively blocks light in order to optically isolate the portions of the Fresnel lens that will produce a specific focal length. The light filter can be a smart glass that changes its opacity under the application of voltage, light or heat. Suitable examples of a smart glass include suspended particle devices, electro-chromatic devices, polymer dispersed liquid crystal displays, etc.

In one non-limiting embodiment, the pattern that is displayed on the light filter includes radial lines that radially emerge from the focal center point, where the arc width of the opaque radial lines is slightly smaller than the arc width of the Fresnel lens segments. The phase angle of each of the radial lines is changed in relation to each Fresnel lens segment in order to produce a change in focal length by only allowing light to interact with isolated radial strips of the Fresnel lens.

Figure 1:
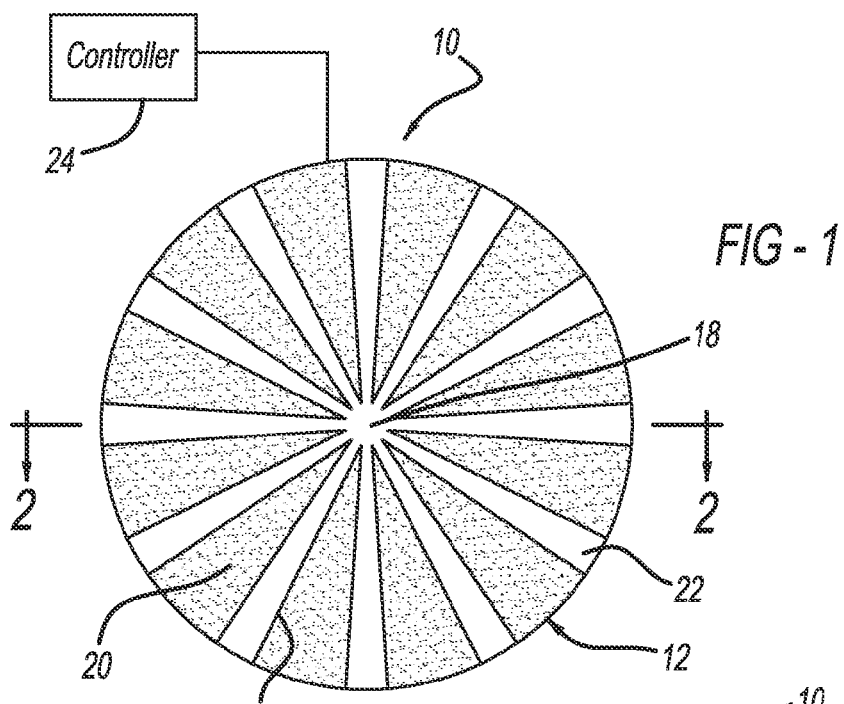
FIG. 1 is a front view of an electronic lens assembly including a light filter and a Fresnel lens.
Figure 2:
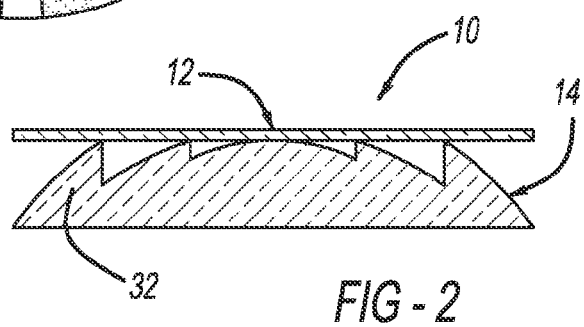
FIG. 2 is a cross-sectional view of the lens assembly shown in FIG. 1.
Figure 3:
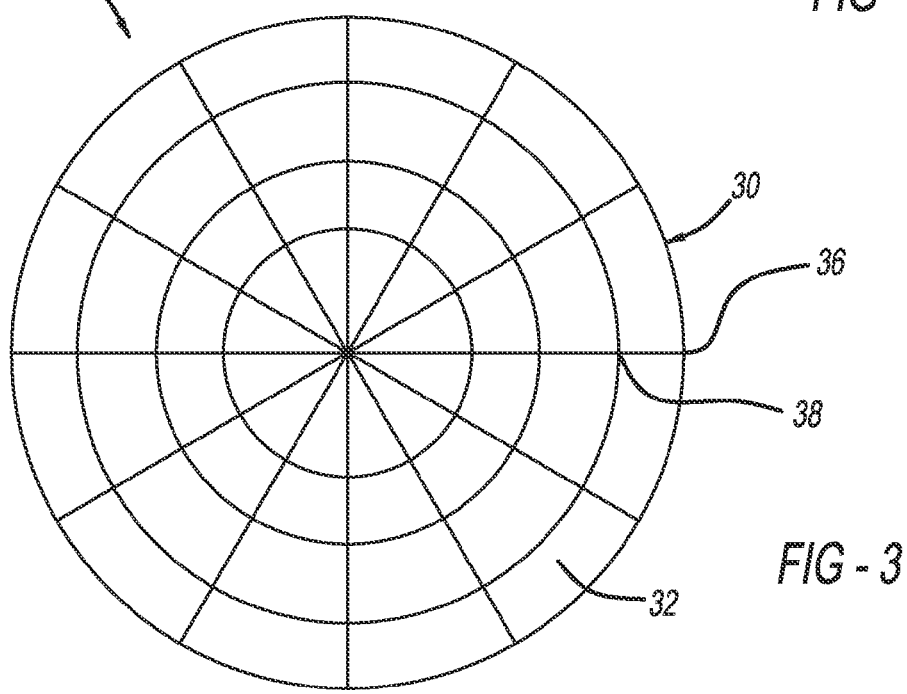
FIG. 3 is a front view of the Fresnel lens separated from the lens assembly.
Figure 4:
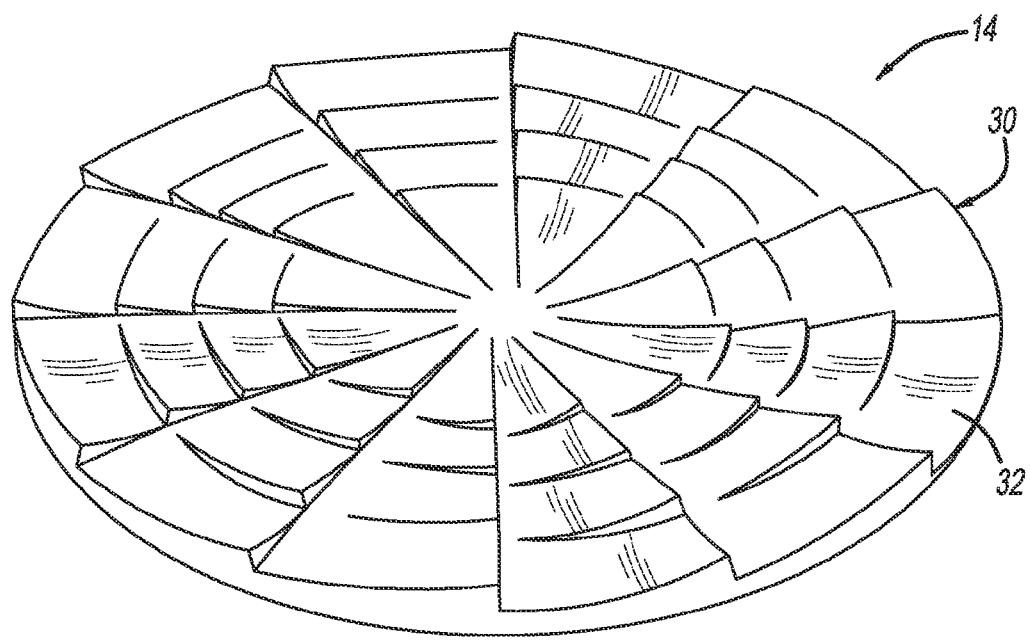
FIG. 4 is an isometric view of the Fresnel lens shown in FIG. 3.

FIG. 1 is a front view and FIG. 2 is a cross-sectional view of an optical lens assembly 10 of the type discussed above. As will be apparent to those skilled in the art, the lens assembly 10 will have application for many optical devices that could benefit from a focusable thin lens, several of which are mentioned above. The lens assembly 10 includes a planar light filter 12 and a Fresnel lens 14, where a top view of the Fresnel lens 14 separated from the lens assembly 10 is shown in FIG. 3 and an isometric view of the Fresnel lens 14 separated from the lens assembly 10 is shown in FIG. 4, and where the lens 14 is shown in a plano-convex format in FIG. 2 and a planoconcave format in FIGS. 3 and 4. The Fresnel lens 14 can be made of any suitable optical material, such as glass or an optical plastic. It is noted that the lens assembly 10 has a circular configuration in this particular embodiment. However, this is by way of a non-limiting example in that other lens assemblies can take on other shapes consistent with the discussion herein.

The light filter 12 includes a series of radial lines 16 that extend from a central hub 18 and have a certain width, where the opacity of the lines 16 can be controlled. The light filter 12 can be any optical device that operates consistent with the discussion herein, such as a smart glass, where different smart glass materials are known in the art, such as those referred to above. For the embodiment where the smart glass is a liquid crystal display, a control voltage is applied to sections of the display to reorient particles therein that cause those sections of the display to be opaque or transparent. For example, a network of clear electrodes (not shown) may extend through the light filter 12 in a suitable configuration, where a suitable potential provided to particular electrodes would cause the lines 16 associated with those electrodes to become opaque or transparent. In the example shown in FIG. 1, a number of the lines 16 would be controlled by the electrodes so that radial sections 20 would be opaque and narrower radial slits 22 would be transparent to allow light to pass therethrough relative to the Fresnel lens 14 for reasons that will become apparent from the discussion below. In this embodiment, each of the lines 16 has the same radial width as each of the slits 22. However, in other embodiments several contiguous lines 16 can be made transparent to provide a single one of the slits 22.

The representation of the non-shaded (transparent) radial slits 22 and the shaded (opaque) radial sections 20 of the light filter 12 shown in FIG. 1 illustrates a configuration of the light filter 12 that provides one focal length for the lens assembly 10. In order to obtain a different focal length of the lens assembly 10, the image shown in FIG. 1 is rotated to some other orientation so that the radial slits 22 allow light to propagate through a different part of the Fresnel lens 14 having a different focal length. In this manner, the lens assembly 10 can change its focal length virtually instantaneously from one focal length to another focal length by changing the display of the light filter 12 through control of the opacity of the lines 16. A controller 24 controls the display of the light filter 12 to change the focal length of the lens assembly 10, and can be any suitable controller that provides voltage, light or heat to the filter 12 depending on the material of the smart glass consistent with the discussion herein.

Figure 5:
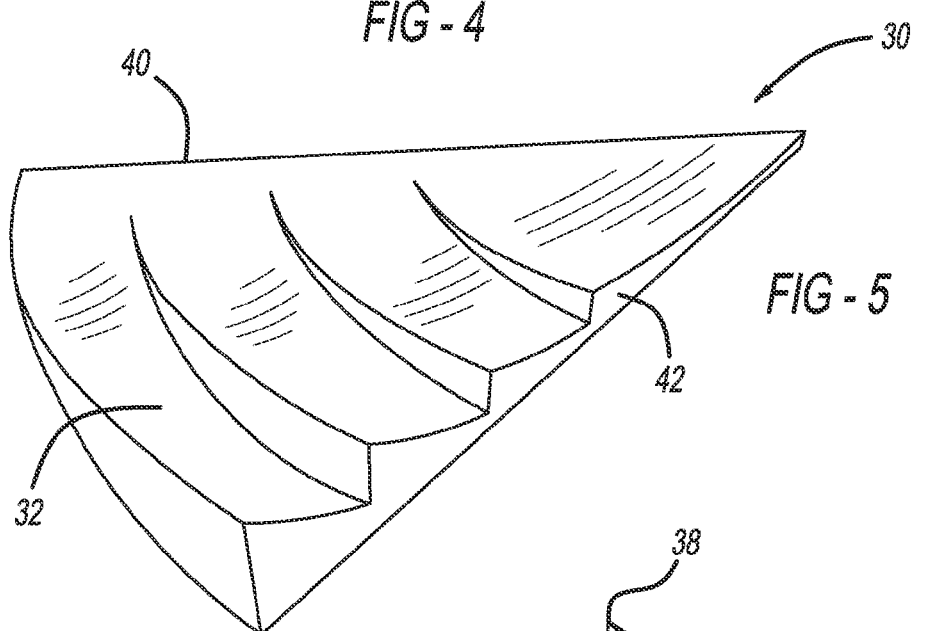
FIG. 5 is an isometric view of one of the Fresnel lens sections in the Fresnel lens shown in FIGS. 3 and 4.
Figure 6:
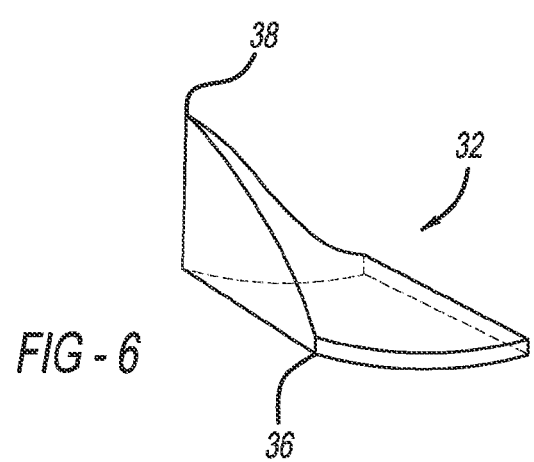
FIG. 6 is an isometric view of one of the Fresnel lens segments in one of the Fresnel lens radial sections.

The Fresnel lens 14 includes a number of radial sections 30, where the arc length of the sections 30 is shown greatly exaggerated such that the Fresnel lens 14 would include many more of the radial sections 30 than is shown in FIGS. 3 and 4. FIG. 5 is an isometric view of one of the radial sections 30 having a configuration to provide continuous focal lengths within a certain range, where all of the radial sections 30 are identical and provide the continuous focal lengths. Each of the radial sections 30 includes a number of separate segments 32 extending in the radial direction, four in this non-limiting embodiment, in the traditional Fresnel lens configuration. Each segment 32 has a varying curvature in the rotational direction so that different areas in each of the segments 32 produces the different focal lengths. FIG. 6 is an isometric illustration of one of the segments 32 in one of the sections 30 showing another illustration of the segment curvature. Points 36 and 38 are identified in the segment 32 shown in FIG. 6 to better show the orientation of the segment 32 in the particular section 30. In this manner, one radial edge 40 of each of the segments 32 has a small curvature and a large radius and an opposite radial edge 42 of each of the segments 32 has a large curvature and a small radius.

The segments 32 in each of the sections 30 are configured relative to each other in the Fresnel lens design so that the curvature of the segments 32 in a particular section 30 focuses the light in the same manner for that section. By providing this curvature in the segments 32, each of the sections 30 provides the same range of focal lengths as all of the other sections 30. Therefore, by selectively controlling the light filter 12 as discussed above so that a radial portion defined by the slit 22 relative to each of the sections 30 allows light to propagate therethrough, one focal length of the lens assembly 10 can be obtained where light is propagating through all of those slits in all of the sections 30. By moving the radial slits 22 to another location in all of the sections 30 another focal length of the lens assembly 10 can be obtained. Since the light filter 12 electrically changes the location of the slits 22, the focal length of the lens assembly can be instantaneously changed at any particular point in time.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An optical lens assembly comprising:
   a Fresnel lens including a plurality of lens sections where each lens section provides a same range of focal lengths and where each lens section includes a plurality of lens segments, wherein each of the lens segments is curved in both a first direction and a second direction so that each lens segment separately provides the range of focal lengths;
   a light filter positioned adjacent to the Fresnel lens and including a plurality of control lines; and
   a control device coupled to the light filter and controlling whether the control lines are opaque or transparent, wherein the control device operates to make the control lines opaque or transparent so that light is only able to propagate through parts of the lens sections having the same focal length.

2. The lens assembly according to claim 1 wherein the Fresnel lens is circular and each lens section is a radial section, and wherein the first direction is a radial direction and the second direction is a rotational direction.

3. The lens assembly according to claim 2 wherein each lens section includes a first radial edge having a relatively small curvature and large radius and a second radial edge having a relatively large curvature and small radius.

4. The lens assembly according to claim 2 wherein the light filter is circular and the control lines are radial control lines.

5. The lens assembly according to claim 1 wherein the light filter is a liquid crystal display and the control device provides a voltage signal to the liquid crystal display to control the opacity of the control lines.

6. The lens assembly according to claim 1 wherein the light filter is a smart glass.

7. The lens assembly according to claim 6 wherein the smart glass is selected from the group consisting of suspended particle devices, electro-chromatic devices and polymer dispersed liquid crystal devices.

8. The lens assembly according to claim 1 wherein the light filter is planar.

9. The lens assembly according to claim 8 wherein the light filter is in contact with the Fresnel lens.

10. The lens assembly according to claim 1 wherein the control device applies a voltage signal, a light signal or a heat signal to the light filter.

11. An optical lens assembly comprising:
a circular Fresnel lens including a plurality of contiguous radial lens sections where each lens section provides a same range of focal lengths and where each lens section includes a plurality of lens segments along a radial direction, wherein each of the lens segments is curved in both the radial direction and a rotational direction so that one radial edge of each lens section includes a relatively small curvature and large radius and an opposite radial edge of each lens section includes a relatively large curvature and small radius so that each lens segment separately provides the range of focal lengths; and
a circular smart glass light filter positioned adjacent to the Fresnel lens and including a plurality of radial control lines, said light filter being controlled to make the control lines opaque or transparent so that light is only able to propagate through parts of the lens sections having the same focal length.

12. The lens assembly according to claim 11 wherein the light filter is a liquid crystal display and a voltage signal is applied to the liquid crystal display to control the opacity of the radial lines.

13. The lens assembly according to claim 11 wherein the smart glass is selected from the group consisting of suspended particle devices, electro-chromatic devices and polymer dispersed liquid crystal devices.

14. The lens assembly according to claim 11 wherein the light filter is planar.

15. The lens assembly according to claim 11 wherein the light filter is in contact with the Fresnel lens.

16. The lens assembly according to claim 11 wherein the light filter is responsive to a voltage signal, a light signal or a heat signal.

17. A Fresnel lens comprising a plurality of contiguous radial lens sections where each lens section provides a same range of focal lengths and where each lens section includes a plurality of lens segments along a radial direction, wherein each of the lens segments is curved in both a radial direction and a rotational direction.

18. The lens according to claim 17 wherein one radial edge of each lens section includes a relatively small curvature and large radius and an opposite radial edge of each lens section includes a relatively large curvature and small radius so that each lens segment separately provides the range of focal lengths.

19. The lens according to claim 18 wherein the lens is circular.

20. The lens according to claim 17 wherein the lens is part of an optical assembly including a light filter.

* * * * *